(12) United States Patent
Murray et al.

(10) Patent No.: US 7,682,509 B2
(45) Date of Patent: Mar. 23, 2010

(54) TRAP FOR REMOVING MATERIAL FROM A FLUID STREAM

(75) Inventors: Christopher Adam Murray, Oakville (CA); Balreet Singh Dandiwal, Brampton (CA); Darren Francis Lawless, Oakville (CA); Gregory Richard Williams, London (CA)

(73) Assignee: Green Turtle Americas Ltd., Charlotte, NC (US)

(*) Notice: Subject to any disclaimer, the term of this patent is extended or adjusted under 35 U.S.C. 154(b) by 15 days.

(21) Appl. No.: 12/015,991

(22) Filed: Jan. 17, 2008

(65) Prior Publication Data

US 2009/0184049 A1 Jul. 23, 2009

(51) Int. Cl.
*B01D 17/028* (2006.01)

(52) U.S. Cl. .................. 210/241; 210/305; 210/514; 210/521; 210/522; 210/540

(58) Field of Classification Search .............. 210/104, 210/241, 257.1, 305, 514, 521, 522, 532.1, 210/538, 540, 801, 802
See application file for complete search history.

(56) References Cited

U.S. PATENT DOCUMENTS

| | | | | |
|---|---|---|---|---|
| 723,618 | A | * | 3/1903 | Newton ............... 210/538 |
| 748,981 | A | | 1/1904 | Oliver |
| 801,330 | A | | 10/1905 | Moore |
| 801,679 | A | * | 10/1905 | Niclausse ............. 210/522 |
| 1,644,728 | A | | 10/1927 | Jahnke |
| 1,645,093 | A | | 10/1927 | Comyn |
| 2,058,044 | A | | 10/1936 | Spencer |
| 2,083,861 | A | | 6/1937 | Padgett |
| 2,090,813 | A | | 8/1937 | Schumacher |
| 2,214,248 | A | | 9/1940 | Hawley |
| 2,412,785 | A | * | 12/1946 | Torricelli ............... 210/538 |
| 2,666,030 | A | * | 1/1954 | Blanchard ............. 210/532.2 |
| 3,483,984 | A | | 12/1969 | Wolkenhauer |
| 3,505,188 | A | | 4/1970 | Pan |
| 3,731,802 | A | | 5/1973 | James |
| 4,048,069 | A | | 9/1977 | Cuvillier et al. |
| 4,116,835 | A | | 9/1978 | Bertelson |
| 4,123,365 | A | | 10/1978 | Middelbeek |
| 4,157,969 | A | * | 6/1979 | Thies ................. 210/521 |
| 4,271,017 | A | * | 6/1981 | Milgram .............. 210/522 |

(Continued)

FOREIGN PATENT DOCUMENTS

EP 0 577 948 1/1994

(Continued)

*Primary Examiner*—Christopher Upton
(74) *Attorney, Agent, or Firm*—Hunton & Williams

(57) ABSTRACT

A buoyant material trap having a treatment tank with a base wall and a vertically-extending sidewall, a feed pipe to introduce fluid at a first location in the tank, and an exit pipe to remove at least a portion of the fluid from a second location in the tank. One or more wall structures form a circuitous passage between the first location and the second location. The wall structures are open at the top and substantially prevent fluid from passing below the passage, but allow buoyant material to rise above the passage. The walls may extend to the bottom of the tank to prevent fluid from passing beneath them, and may be removably installed in the tank to facilitate cleaning. An overflow chamber may be provided to receive buoyant material. The sidewall may have a spout and be adapted to empty the tank by tilting.

29 Claims, 5 Drawing Sheets

U.S. PATENT DOCUMENTS

| | | | |
|---|---|---|---|
| 4,308,136 A | 12/1981 | Warne et al. | |
| 4,345,920 A | 8/1982 | Ross | |
| 4,400,274 A | 8/1983 | Protos | |
| 4,425,239 A | 1/1984 | Jacocks et al. | |
| 4,980,070 A | 12/1990 | Lieberman | |
| 5,122,280 A | 6/1992 | Russell et al. | |
| 5,132,010 A | 7/1992 | Ossenkop | |
| 5,266,191 A | 11/1993 | Greene et al. | |
| 5,314,617 A * | 5/1994 | Karterman | 210/521 |
| 5,431,826 A * | 7/1995 | Becker et al. | 210/521 |
| 5,454,937 A * | 10/1995 | Lewandowski | 210/540 |
| 5,458,770 A | 10/1995 | Fentz | |
| 5,494,586 A | 2/1996 | Inoue | |
| 5,637,221 A | 6/1997 | Coyne | |
| 5,861,098 A | 1/1999 | Morrison | |
| 5,993,646 A | 11/1999 | Powers | |
| 6,364,122 B1 | 4/2002 | Massey | |
| 6,416,675 B1 | 7/2002 | McCasland et al. | |
| 6,558,558 B1 | 5/2003 | Hall | |
| 6,849,176 B1 * | 2/2005 | Batten et al. | 210/257.1 |
| 6,951,615 B2 | 10/2005 | Tripodi et al. | |
| 7,160,450 B2 | 1/2007 | Foong et al. | |
| 7,186,346 B1 | 3/2007 | Batten et al. | |
| 7,223,348 B1 | 5/2007 | Seregin et al. | |
| 7,438,803 B1 * | 10/2008 | Allen | 210/521 |
| 2003/0201226 A1 | 10/2003 | Kelly | |
| 2008/0179262 A1* | 7/2008 | Batten et al. | 210/540 |
| 2009/0014392 A1* | 1/2009 | McEwen et al. | 210/522 |

FOREIGN PATENT DOCUMENTS

| | | |
|---|---|---|
| GB | 2 036 579 | 7/1980 |
| WO | WO 2007/027952 | 3/2007 |

\* cited by examiner

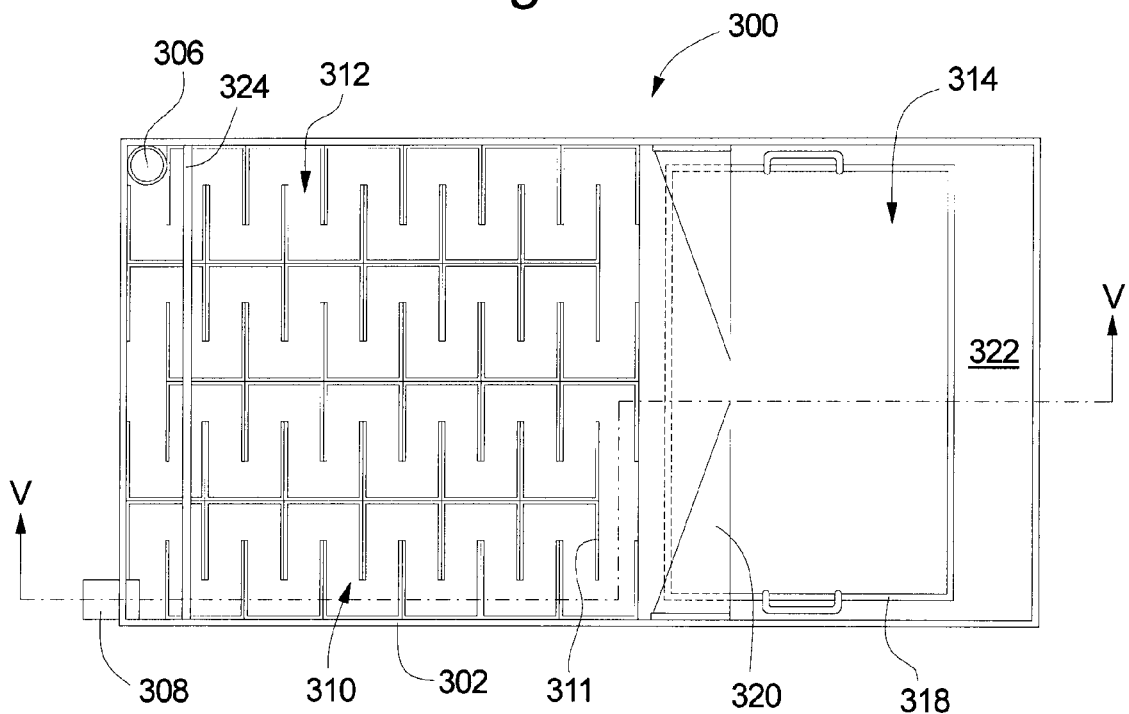
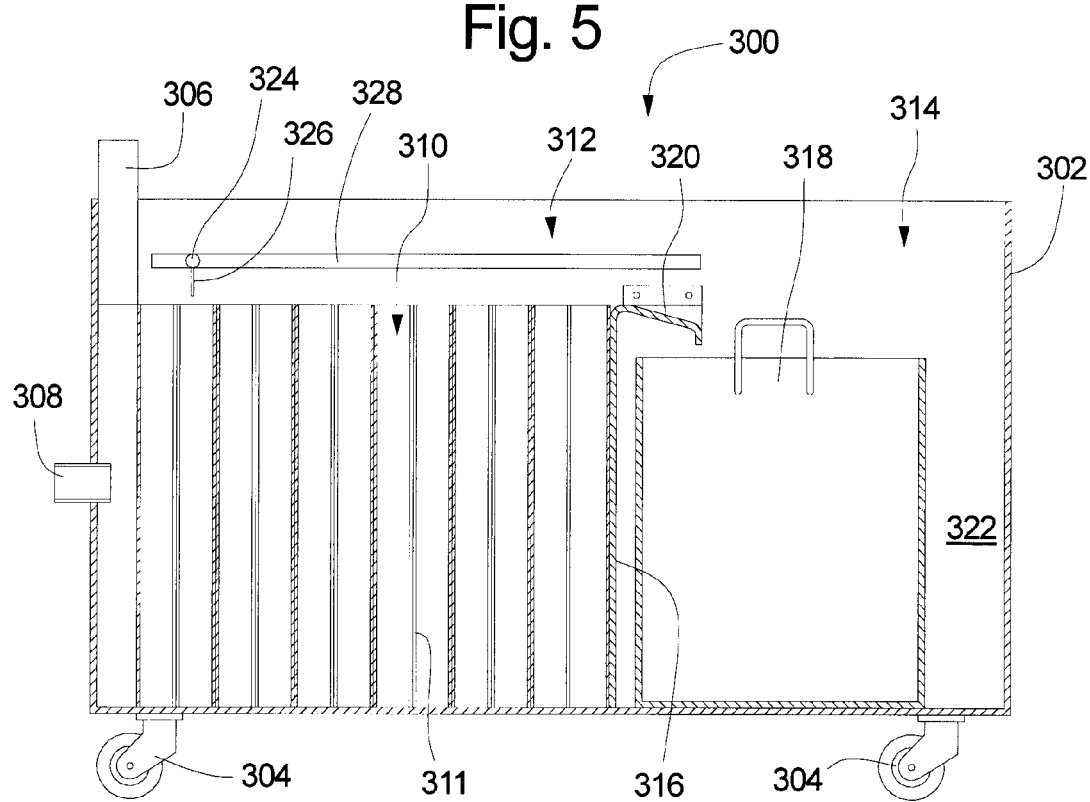

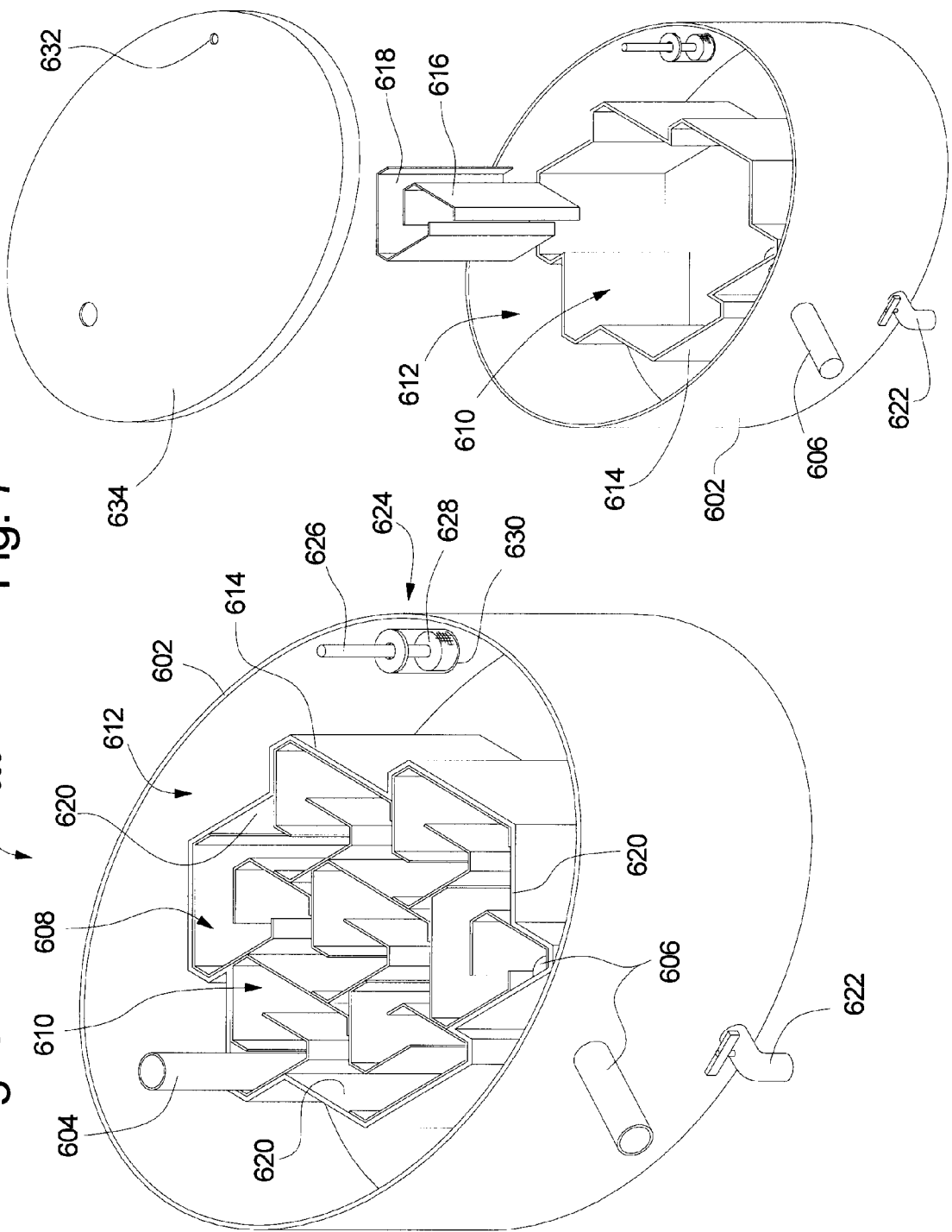

TRAP FOR REMOVING MATERIAL FROM A FLUID STREAM

FIELD OF THE INVENTION

The present invention relates to grease and oil traps for commercial sinks, and similar applications in which it is desired to remove materials from a fluid stream.

BACKGROUND OF THE INVENTION

A number of devices for removing grease, oil, fat, floatable solids, and other relatively buoyant materials from denser fluids have been suggested in the prior art. For example, U.S. Pat. No. 4,425,239, discloses a method and apparatus for separating oil from water in which mixed fluid is passed through a spiral passage to a pair of concentric but vertically displaced outlets for lighter and heavier fluids. In this device, the fluid appears to remain trapped within the confines of the spiral passage, and does not flow over it. Other devices, such as the device shown in U.S. Pat. No. 2,083,861, introduce a mixture of gasoline and water into a chamber and pass the fluid through series of baffles to separate the fluids. This device appears to be a sealed assembly that can not be easily cleaned, and appears unsuitable for treating fluids that may be contaminated with solids that may accumulate within the device. The foregoing references are incorporated herein.

The present invention provides unique and novel features and systems relating to buoyant material traps and the like, and such features and systems may be used independently or integrated into known or otherwise conventional devices to provide novel variations thereof.

SUMMARY OF THE INVENTION

In one exemplary aspect, a trap for removing buoyant material from fluid is provided. The trap has a treatment tank with a base wall and a vertically-extending sidewall, a feed pipe adapted to introduce a fluid flow at a first location in the treatment tank, and an exit pipe adapted to remove at least a portion of the fluid flow from a second location in the treatment tank. The trap has one or more wall structures adapted to form a circuitous passage, with respect to a horizontal plane, between the first location and the second location. The wall structure(s) extends from the base wall to a point below the sidewall and is open at its top end. The wall structure(s) substantially prevents the fluid flow from passing below the circuitous passage, but allows buoyant material in the fluid flow to rise above the circuitous passage. The wall structure(s) are removably installed in the treatment tank such that they can be lifted out of the treatment tank to facilitate cleaning. A mesh bag or wire cage may optionally be used below the wall structures to help collect debris that accumulates in the trap.

In another exemplary aspect, another trap for removing buoyant material from a fluid is provided. The trap has a treatment tank with a base wall and a vertically-extending sidewall, a feed pipe adapted to introduce a fluid flow at a first location in the treatment tank, and an exit pipe adapted to remove at least a portion of the fluid flow from a second location in the treatment tank. The trap has one or more wall structures adapted to form a circuitous passage, with respect to a horizontal plane, between the first location and the second location. The wall structure(s) is open at its top end to allow buoyant material in the fluid flow to rise above the circuitous passage. The treatment tank also has a treatment chamber in which the circuitous passage is located, and an overflow chamber adjacent the treatment chamber. The overflow chamber is fluidly connected to the treatment chamber such that at least a portion of the buoyant material that rises above the circuitous passage can flow into the overflow chamber.

In still another exemplary aspect, yet another trap for removing buoyant material from a fluid is provided. The trap has a treatment tank with a base wall and a vertically-extending sidewall, a feed pipe adapted to introduce a fluid flow at a first location in the treatment tank, and an exit pipe adapted to remove at least a portion of the fluid flow from a second location in the treatment tank. The trap has one or more wall structures adapted to form a circuitous passage, with respect to a horizontal plane, between the first location and the second location. The wall structure(s) extends from the base wall to a point below the sidewall and is open at its top end. The wall structure(s) substantially prevents the fluid flow from passing below the circuitous passage, but allows buoyant material in the fluid flow to rise above the circuitous passage. An opening is provided near an upper end of the sidewall, and the buoyant material can be emptied from the treatment tank when the treatment tank is tipped towards the opening. A lower edge of the sidewall below the opening is adapted to contact at least two points on a floor when the treatment tank is tipped towards the opening to provide a tilting axis about which the trap can rotate.

BRIEF DESCRIPTION OF THE DRAWINGS

Illustrations of various exemplary embodiments are provided in the following drawings, in which like reference characters are used to indicate like elements.

FIG. 4 is a top view of the embodiment of FIG. 3.

FIG. 5 is a cutaway side view of the embodiment of FIG. 3, shown along line V-V of FIG. 4.

FIG. 6 is an isometric view of a third exemplary embodiment of a buoyant material trap.

FIG. 7 is a partially-exploded isometric view of the embodiment of FIG. 6.

DETAILED DESCRIPTION OF EXEMPLARY EMBODIMENTS

The following description is intended to convey an understanding of the inventions disclosed herein by describing a number of exemplary embodiments of devices that are adapted to operate as undersink traps for removing buoyant materials (e.g., oil, grease, fats, cleaning solvents, buoyant solids, etc.) from sink water. It will be appreciated, however, that the present invention is not limited to the exemplary embodiments, the figures, the summary of the invention, the abstract, or to any other specific disclosures herein. For example, embodiments of the invention may be used in settings other than the commercial sink environment described herein, may be sized or shaped to be used in any suitable manner, may be adapted to remove materials other than grease, oil and the other kinds of material described herein, and so on. It is further understood that one possessing ordinary skill in the art will appreciate the use of the invention for its intended purposes and benefits in any number of alternative embodiments, depending upon specific design needs and other considerations, and may adapt or use the embodiments to obtain other benefits or for other purposes.

The terminology used herein is for the purpose of describing particular embodiments only, and is not intended to limit the scope of the present invention. As used throughout this disclosure, the singular forms "a," "an," and "the" include the plural unless the context clearly dictates otherwise. Thus, for example, a reference to "an inlet" includes a plurality of inlets, or other equivalents or variations thereof known to those skilled in the art. Unless defined otherwise, all technical and scientific terms used herein have the same meanings as commonly understood by one of ordinary skill in the art to which this invention belongs.

Figure 1:
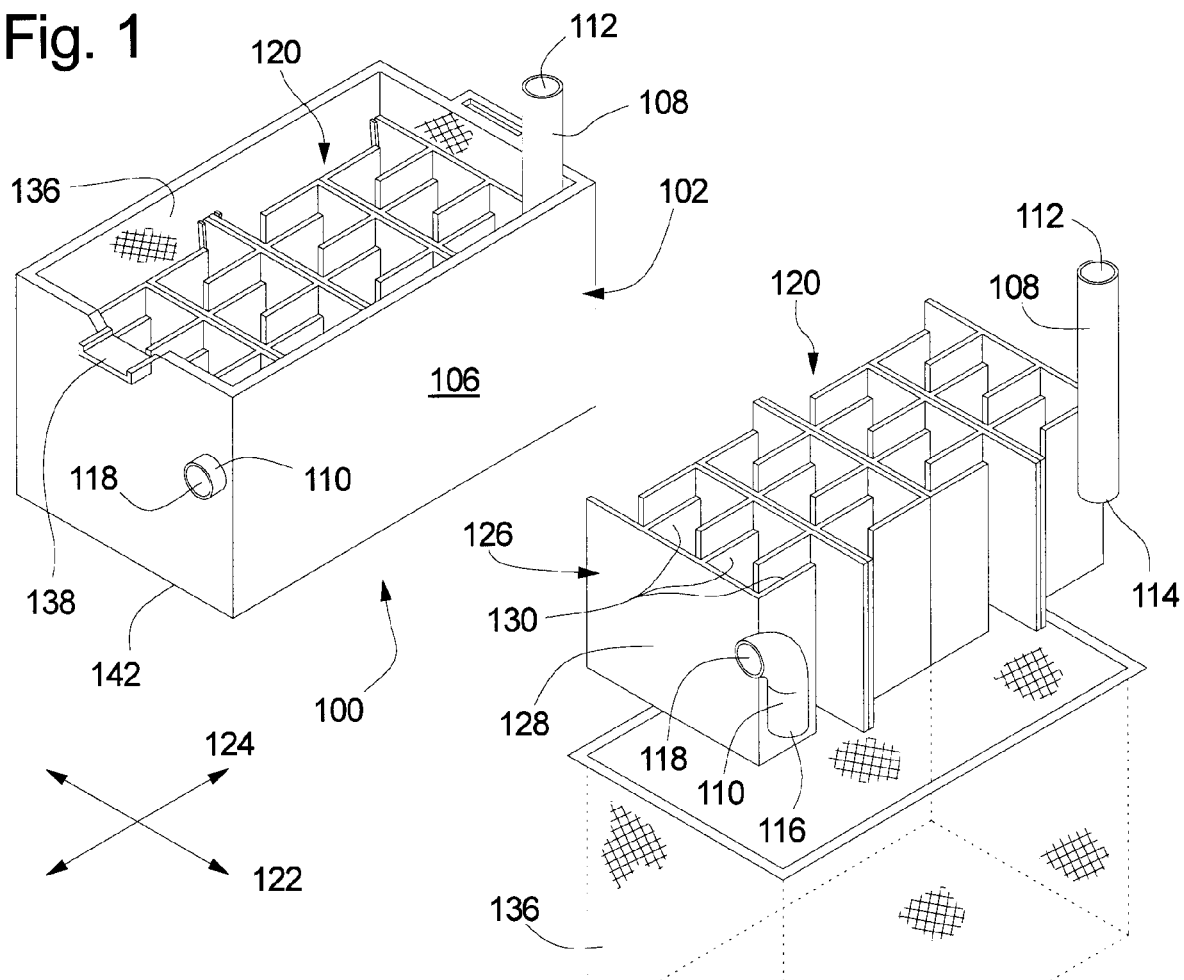
FIG. 1 is an isometric view of a first exemplary embodiment of a buoyant material trap.
Figure 2:
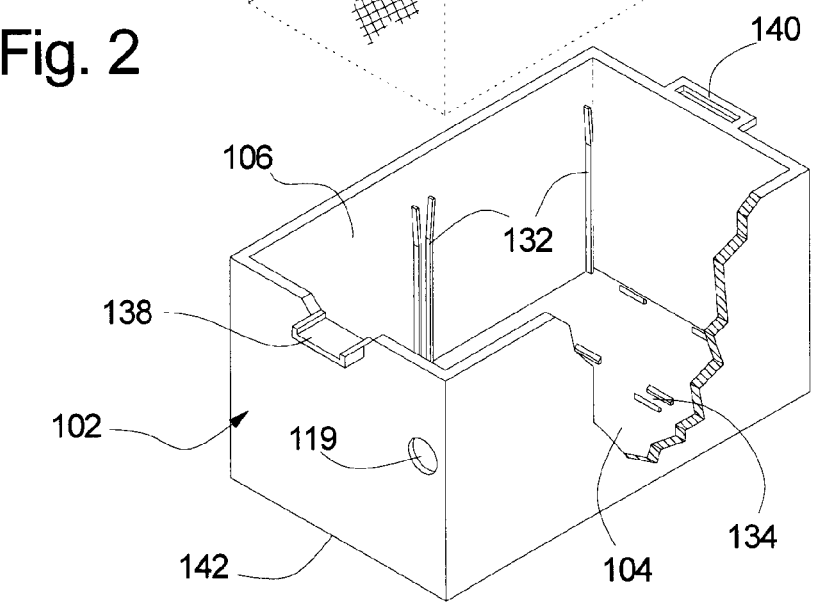
FIG. 2 is an exploded view of the embodiment of FIG. 1.

A first exemplary embodiment of a buoyant material trap 100 is shown assembled in FIG. 1, and disassembled in FIG. 2. The trap 100 includes a treatment tank 102 having a base wall 104 and an upwardly-extending sidewall 106. A cover (not shown) may be provided to enclose the top of the treatment tank 102. A feed pipe 108 is provided to introduce fluid into the treatment tank 102, and an exit pipe 110 is provided to allow fluid to exit the treatment tank 102. The feed pipe 108 includes a feed pipe inlet 112 that may be attached to a fluid source, such as a sink drain, and a feed pipe outlet 114 positioned to convey the fluid into the treatment tank 102. The exit pipe 110 includes an exit pipe inlet 116 that receives fluid from the treatment tank 102, and an exit pipe outlet 118 that conveys fluid outside the treatment tank 102. For purposes of this discussion, the exit pipe outlet 118 is understood to be the portion of the outlet pipe 110 (or any extension thereof) that is elevated at the highest point relative to the treatment tank 102. The feed pipe outlet 114 and/or exit pipe inlet 116 may be formed as a vertically-extending riser pipe, as shown, which may be adjustable to modify hydraulic performance and the buoyant material holding characteristics of the trap 100, and may include a T-fitting, elbow fitting, screen filter, or other features known in the art.

The feed pipe 108 and the exit pipe 110 may be constructed from any suitable pipe, rigid or flexible hose, or other fluid conduit. For example, the pipes may comprise polyvinyl chloride (PVC) pipe or other conventional plumbing pipes. In addition, while the feed pipe 108 and exit pipe 110 are illustrated as separate pipes that are inserted into the device (the feed pipe 108 enters through the open top of the treatment tank 102, and the exit pipe 110 passes through an outlet hole 119 through the sidewall 106), one or both may instead comprise a simple opening through the treatment tank's sidewall 106 or base wall 104. Either pipe also may be formed integrally with the treatment tank 102. In the shown embodiment, the feed pipe outlet 114 is located below the exit pipe outlet 118, which may help introduce fluid quiescently into the treatment tank 102, but this is not required in all embodiments. For example, in an alternative embodiment, the feed pipe outlet 114 may be located above the treatment tank sidewall 106, and fluid may pour freely into the treatment tank 102 from a distance. The feed pipe outlet 114 also may include a pre-treatment device to break down emulsified oil, coagulate or remove solids, or otherwise assist with removing materials from the fluid stream. Such pre-treatment devices also could be located elsewhere in the feed pipe 112, or upstream of the feed pipe 112.

An internal passage system 120 is provided in the treatment tank 102 between the feed pipe 108 and the exit pipe 110. The passage system 120 comprises one or more walls or baffles that create a circuitous passage between the feed pipe 108 and the exit pipe 110. These walls may extend to the base wall 104 of the treatment tank 102 to prevent or inhibit fluid from bypassing the passage system 120 by flowing under it. The passage system walls may extend only partly up the height of the treatment tank sidewall 106, and thereby form an open area above the passage system 120 that allows a portion of the treated fluid to flow over the walls. For example, the passage system walls may extend less than about 80% of the total height of the internal volume of the tank 102, and may only extend to about 10% to about 25% of the tank's height, leaving the remainder of the tank for accumulating oil and other lighter substances. In the shown exemplary embodiment, the passage system 120 walls terminate above the feed pipe outlet 114 and the exit pipe inlet 116, but this is not strictly required. For example, the feed pipe outlet 114 may be located above the top of the passage system 120.

The internal passage system 120 may comprise any arrangement of walls or baffles that increases the distance that fluid must traverse, with respect to a horizontal plane, in order to travel from the feed pipe outlet 114 to the exit pipe inlet 116. For example, in the shown embodiment, the internal passage system 120 comprises a circuitous flow path that reverses itself along a first axis 122 three times, and along a second axis 124 (perpendicular to the first axis 122) twenty-four times. Measured along the centerline of the passageway, this exemplary passage system 120 is approximately 6.73, times longer than the straight-line distance between the feed pipe outlet 114 and the exit pipe inlet 116. Increasing the distance the fluid must pass to reach the exit pipe 110 can improve separation of floatables, and other pollutants or debris from the treated fluid, by increasing the dwell time of the fluid in the tank and encouraging the development of plug flow. Providing an open space above the passage system 120 may allow buoyant material to settle above the passage system 120, and such material can be collected independently of the operation of the passage system 120.

The internal passage system 120 may be constructed integrally with the treatment tank 102, or it may be formed as one or more separate parts. In the exemplary embodiment of FIGS. 1 and 2, the passage system 120 is formed by eight similar or identical wall structures 126. Each wall structure 126 includes a base wall 128 from which three cross-walls 130 extend at right angles to form an F-like shape having an extra horizontal crossbar. As shown, the wall structures 126 may be arranged with their base walls 128 adjacent one another (except for the two end wall structures 126), and with their cross-walls 130 interlocked to form a circuitous passage between them. The wall structures 126 are installed—one at a time, or as one or more pre-assembled groups—into the treatment tank 102. Slots 132, tabs 134, grooves or other raised or recessed features may be provided on the sidewall 106 and/or base wall 104 to help properly align the wall structures 126 within the treatment tank 102. Fasteners, such as screws or snap-engaging features, may be used with the slots 132 or tabs 134 to securely hold the wall structures 126 in place. For example, the bottom of the wall structures 126 may have bulges that snap into the tabs 134.

The foregoing arrangement is expected to provide a number of benefits. For example, the passage system 120 is conveniently formed by a series of simple, repeating shapes that may be relatively inexpensive to fabricate from sheet metal, fiberglass, or other conventional materials. The use of repeating shapes also may facilitate assembly and servicing by being interchangeably positionable in various different locations within the housing, which eliminates the need to keep track of where each individual part must be located, and simplifies reassembly after cleaning. In the shown embodiment, only one repeating shape is required, but in other embodiments, the repeating shapes may be modified and/or supplemented by additional repeating or non-repeating shapes, as will be appreciated by persons of ordinary skill in the art in view of the teachings provided herein. The wall structures 126 also may be removed and replaced with new structures, if it is determined that an alternative arrangement of structures might provide improved performance or other benefits. Still further, the wall structures 126 may be designed to be useable in a number of different traps 100 having different shapes or sizes. This may provide a cost savings where it is desired to retrofit a number of different preexisting traps with internal passage systems 120, because it may reduce the total number and/or type of wall structures 126 that must be produced to accommodate multiple products in the product line.

The foregoing exemplary embodiment also provides an advantage in that the passage system 120 may be removed to clean the treatment tank. This may be particularly beneficial in environments where the incoming fluid has solids or denser fluids entrained in it, because such solids can block the passage system 120, and can effectively reduce the depth of the layer of denser fluid flowing from the feed pipe 108 to the exit pipe 110, possibly affecting the hydraulic balance of the contents of the trap 100. It will be understood that this advantage may be realized regardless of whether the passage system 120 comprises multiple repeating wall structures 126. To further facilitate cleaning, a mesh net 136 (such as a cheesecloth bag or a metal wire basket) may be installed between the passage system 120 and the treatment tank 102 to collect and retain debris that sinks to the bottom of the treatment tank 102. If desired, the mesh net 136 may be replaced by an impermeable bag, a rigid liner, or any other suitable removable liner to capture solids and heavier material that may settle in the treatment tank 102.

The exemplary embodiment of FIGS. 1 and 2 may be installed in any fluid system to help capture and remove relatively buoyant material from a fluid stream. In one example, the trap 100 may be shaped and sized to fit under a typical commercial or residential sink to help removed floating debris, and lighter-than-water materials, such as grease, oil, fat, solvents, and the like. It will be understood, however, that other applications for the device may be possible. In one example of an embodiment for under sink use, the treatment tank may be about 24, inches long, about 20, inches wide, about 20, inches high, hold about 41, U.S. gallons at full capacity, and be adapted for treating flows up to about 50, gallons per minute.

In use, a fluid containing buoyant material enters the trap 100 through the feed pipe 108 and begins moving towards the exit pipe 110. As noted above, the passage system 120 extends to the bottom of the treatment tank 102. Thus, the fluid must travel along the circuitous path (or paths) formed by the passage system 120 to reach the exit pipe 110, and relatively little or none of the water can "short circuit" directly to the exit pipe 110. Any path or paths that increase the distance that the fluid must travel to reach the exit pipe 110 may be used as the circuitous path. As the fluid progresses towards the exit pipe 110, the buoyant material rises out of the denser water (or other fluid in which the buoyant material is entrained) and may eventually rise above the top of the passage system 120. In addition, the passage system 120 may be shaped and sized to encourage the formation of plug flow, which is expected to increase the likelihood that buoyant material will separate from the water before the water reaches the exit pipe 110. The buoyant material separated from the water accumulates above the level of the exit pipe inlet 116, and, if the exit pipe outlet 118 is elevated high enough, can rise above the top of the passage system 120.

The separated buoyant material eventually may form a thick layer under which the fluid must pass, and during periods of idleness, separation may continue to occur. The layer of separated buoyant material may eventually become thick enough to reach the exit pipe inlet 116, at which time it will be necessary to remove the separated buoyant material from the treatment tank 102. The relative heights of the tank sidewall 106 and the exit pipe outlet 118 may be selected to prevent the treatment tank 102 from overfilling. During idle periods, some fluid may remain in the treatment tank 102 at or below the level of the exit pipe inlet 116, and after the device is cleaned, it may be filled to this level with water to provide an initial operating charge. The initial charge can be provided by filling the tank 102 with clean water, which may be provided through the feed pipe 112 or the top of the tank 102. If the initial charge is provided through the feed pipe 112, care may be taken to prevent the initial charge from including a large amount of oil or other contaminants, which may flow out the exit pipe 110 as the water level in the tank 102 rises.

The exemplary embodiment of FIGS. 1 and 2 may be emptied in any suitable way. For example, a spout 138 may be provided at or near the top of the treatment tank 102, and the trap may be emptied by tilting it to pour its contents through the spout 138 and into an appropriate receptacle or drain. Such a tipping operation can be facilitated by providing an integrated handle 140 to grasp the trap 100, rounding the lower edge 142 of the trap 100 below the spout 138, mounting the trap 100 on pinions, and so on. In order to firmly support the trap 100 during such tilting, the lower edge 142 below the spout may be straight (as shown) or have at least two support points that contact the floor to provide a tilting axis about which the trap 100 rotates during tilting. Providing such a tilt axis can help prevent the trap 100 from shifting or rolling—which may result in spilling the contents of the trap 100—when the trap 100 is tilted. During tilting, the exit pipe 110 may remain connected to a water drain, or may be disconnected, covered or closed off to prevent fluid from passing through it during emptying, or the spout may be located remotely from the exit pipe 110 (such as at the other end of the treatment tank 102) so that tilting the trap 100 does not cause fluid to flow through the exit pipe 110. If desired, the feed pipe 112 and/or the outlet pipe may be attached by quick-connect or dry-break fittings to allow the trap 100 to be easily removed from its location. The trap may instead be emptied by vacuuming or siphoning away the separated buoyant material, skimming the buoyant material off the surface, draining the buoyant material through an outlet (not shown) located above the exit pipe inlet 116, or by other mechanisms or means, as will be appreciated by persons of ordinary skill in the art in view of the present disclosure.

It will be appreciated that numerous variations may be made to the foregoing exemplary embodiment. For example, some of the walls forming the fluid passage system 120 may extend higher than others, to thereby influence or control the movement of buoyant materials that rise above the water. Portions of the top of the fluid passage system 120 also may be closed, rather than open. For example, one or more covers may be provided to partially enclose the passage system 120, or the wall structures 126 forming the passage system 120 may be joined to one another by horizontal straps located at the top ends thereof that may partially block the open top of the passage system 120.

One or more filters, vertical flow directors (such as a series of angled upwards and downwards baffles), precipitators or other fluid treatment devices may be provided in or above the passage system 120 to treat the fluid and/or buoyant materials. For example, an oil-polishing filter may be provided over the spout 138 to clean particulate matter out of oil as it is being drained from the trap 100. Such a filter may also be used on the exit pipe 110. In addition, other absorptive media, adsorptive media, filters, or other such devices may be included within the trap 100 at locations where oil or other contaminants are expected to accumulate, such as in the latter part of the passage system 120, or above the passage system 120.

The trap 100 also may be mounted on a rack, wheels or casters, and it may have an attached or associated oil storage compartment or oil drain line for the separated buoyant materials. The trap 100 also may be used in conjunction with other separation or trap devices. Furthermore, additional variations may arise as a result of typical manufacturing tolerances and variables. For example, slight variances in the shape and or size of the walls that form the internal passage system 120 may cause some of the walls not to fully seal against the base wall 104, in which case some fluid may pass beneath the fluid passage system 120.

Figure 3:
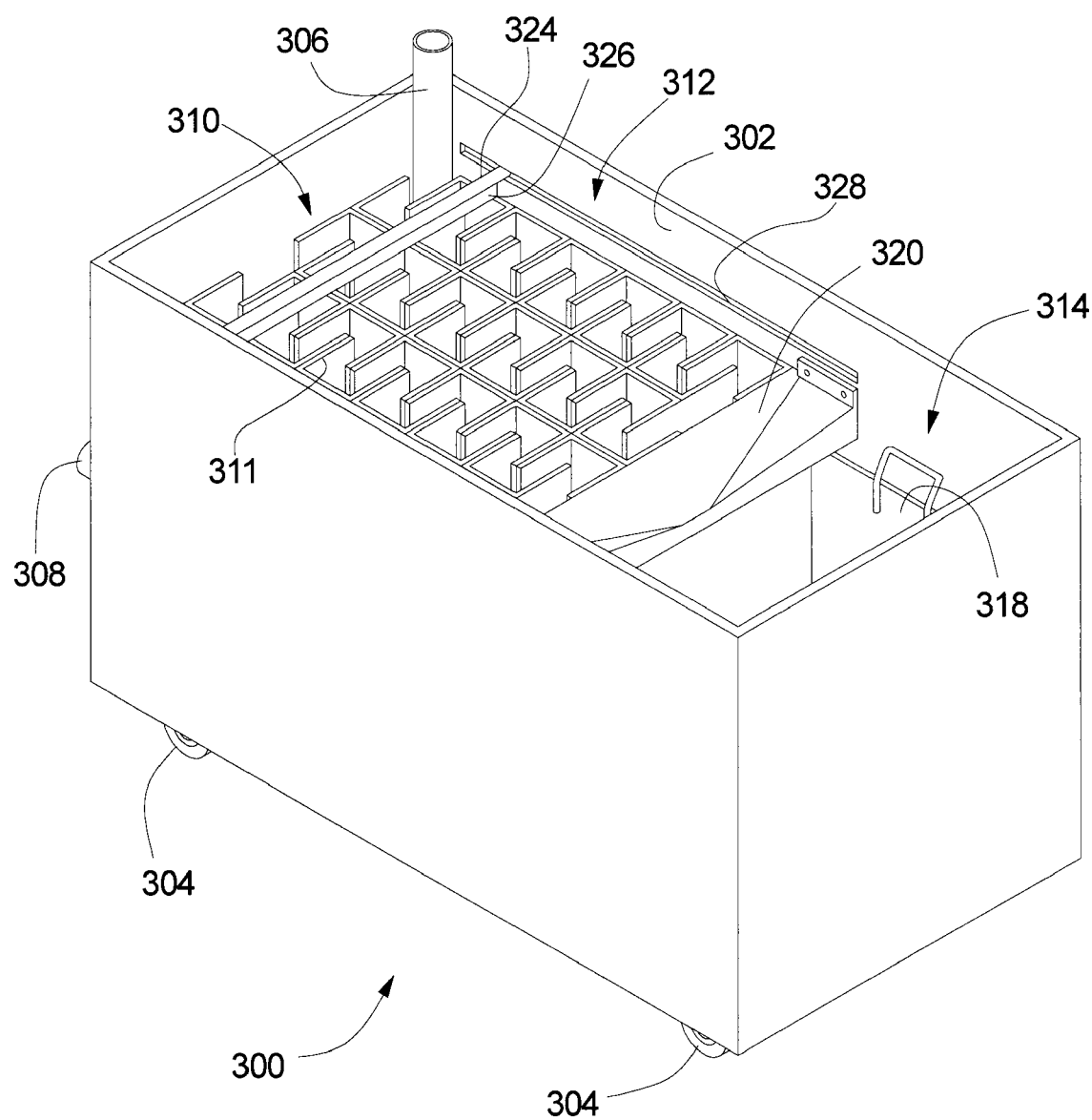
FIG. 3 is an isometric view of a second exemplary embodiment of a buoyant material trap.

A second exemplary embodiment of a trap is illustrated in FIGS. 3-5. In this embodiment, the trap 300 comprises a treatment tank 302 mounted on wheels 304. As with the previous embodiment, the treatment tank 302 may include a feed pipe 306, an exit pipe 308, and an internal passage system 310. In this exemplary embodiment, the internal passage system 310 provides forty-eight flow reversals in the lateral direction, and three flow reversals in the longitudinal direction, and multiplies the fluid travel path between the feed pipe 306 and the exit pipe by a factor of about 13.5. The passage system 310 may be made from F-shaped pieces, as in the previous embodiment, or from other repeating or non-repeating shapes. For example, in the shown embodiment, the passage system is made entirely of C-shaped members 311 that are assembled to form a circuitous passage.

The treatment tank 302 may be divided into two chambers: a main treatment chamber 312, and an overflow chamber 314. The internal passage system 310 resides in the main treatment chamber 312, where it operates as described above with respect to the exemplary embodiment of FIGS. 1 and 2. The overflow chamber 314 is adjacent the treatment chamber 312, and may be divided from the treatment chamber 312 by one or more walls 316. The wall 316 is high enough to generally prevent denser fluid in the passage system 310 from entering the overflow chamber 314, but low enough to allow buoyant materials separated from the denser fluid to flow into the overflow chamber 314. Thus, the overflow chamber 314 can receive and store the relatively buoyant materials removed from the fluid entering the trap 300. A skimming device, such as a simple rod 324 with a flap 326 hanging from it, may be provided above the passage system 310 to manually move buoyant materials across the passage system 310 to the overflow chamber 314. As shown, the rod 324 slides within grooves 326 on either side of the treatment chamber 312, but other arrangements, such as an automatically operated device, or a skimmer that is not attached to the trap 300, may be used instead.

While the overflow chamber 314 may comprise a simple receptacle, in the exemplary embodiment of FIGS. 3-5, a removable bucket 318 is provided to receive the buoyant materials that flow into the overflow chamber 314. A spillway 320 may be provided—as a separate part or as part of the wall 316 dividing the chambers—to direct the incoming material into the bucket 318. Where a spillway 320 is provided, an additional space 322, or a door or access panel may be provided to allow the bucket 318 to slide out from under the spillway 320.

It will be understood that numerous variations may be made to the above embodiment. For example, the bucket 318 may be replaced by a flexible bladder, and may be connected to the spillway 320 by a hose or other conduit. The bucket 318 also may be stored outside the treatment tank 302, and the overflow chamber 314 may be omitted. In addition, a cover (not shown) may be provided to enclose the tops of one or both chambers 312, 314.

A third exemplary embodiment of a buoyant material trap is illustrated in FIGS. 6 and 7. In this embodiment, the trap 600 may comprise a treatment tank 602, a feed pipe 604, an exit pipe 606, and an internal passage system 608. The treatment tank 602 is divided into a treatment chamber 610 and an overflow chamber 612 by a wall 614. As shown, the overflow chamber 612 may be located generally annularly around the treatment chamber 610, but this is not strictly required of all embodiments. If necessary, the exit pipe 606 may pass through the dividing wall 614 to reach the treatment chamber 610, as shown.

In this exemplary embodiment, the passage system 610 comprises a series of first and second repeating shapes 616, 618, that are assembled to form a circuitous passage from the feed pipe 604 to the exit pipe 606. The repeating shapes are assembled together to form tapered or triangular S-shaped passage units that can be joined together to form a generally continuous serpentine passage. At certain locations, there may be gaps 620 in the passage where the walls of the shapes 616, 618 do not join. Additional suitably-shaped wall members may be provided at such gaps 620 to close them, or they may be closed by the dividing wall 614, such as in the exemplary embodiment. As with the previous embodiments, the passage system 610, feed pipe 604, and exit pipe 606 each may be removable or permanently affixed to the trap 600.

The overflow chamber 612 is positioned to receive the buoyant materials separated from the denser fluid as it spills over the top of the dividing wall 614 (which may or may not be the same height as the internal passage system 608). The overflow chamber 612 may be emptied by opening a valve 622 located on the side of the trap 600. In other embodiments, other emptying systems may be employed. For example, the overflow chamber may be emptied by tipping the trap 600, being funneled into a bucket or other removable or separate receptacle, by vacuuming or siphoning, or by other methods or mechanisms.

In this or other embodiments, a level indicator may be provided to indicate when the trap 600 needs to be emptied. The level indicator may comprise any device that senses and signals the height of the fluid or other materials in the trap 600. In the illustrated embodiment, the level indicator 624 comprises a gauge 626 that is attached to a buoyant float 628. The float 628 and gauge 626 are retained in a cage 630 that allows them to move up and down as the fluid level rises and falls. The gauge 626 is aligned with a hole 632 through a trap cover 634, and when it rises on the rising fluid, it protrudes through the cover to indicate that the trap 600 is full. It will be understood that any other kind of level indicator may be used, such as an electronic level indicator that illuminates a light or activates an audible signal when the trap 600 is full, a graduated gauge that indicates the amount of fluid in the trap 600, and so on.

The trap cover 634 may include features to assist with maintaining the trap. For example, it might have a window to view into the trap. Such windows also may be on the side of the tank to see the water and oil levels therein. The cover 634 also may include a structure to hold the repeating shapes 616, 618 that form the passage through the trap. For example, the cover 634 may have one or more tabs or slots on its bottom side into which the repeating shapes 616, 618 can be snap-fit to hold them during servicing. The cover 634 also may be attached to the repeating shapes 616, 618 so that it lifts them out when the cover is removed. Such features may, of course, be used with other embodiments of the invention.

Figure 8:
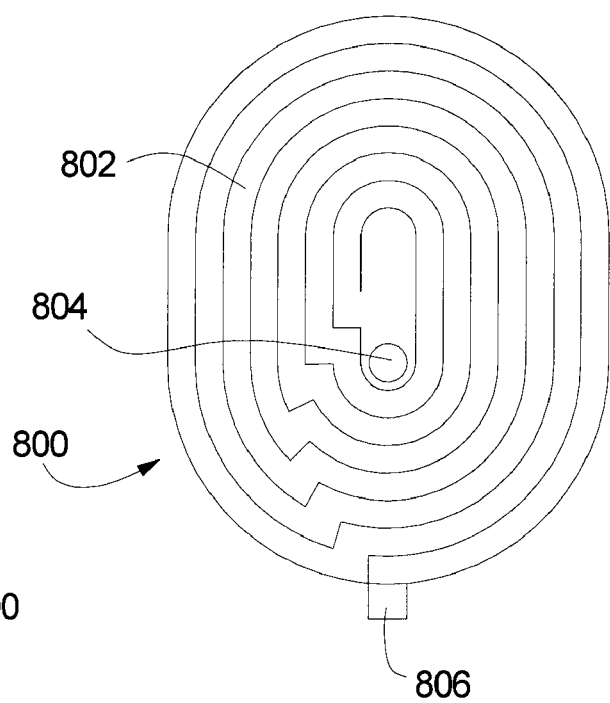
FIG. 8 is a top schematic view of a fourth exemplary embodiment of a buoyant material trap.
Figure 9:
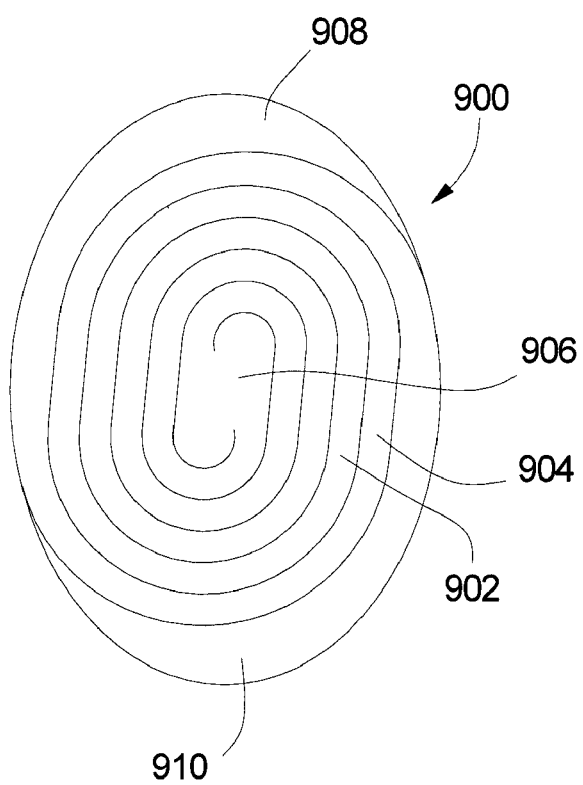
FIG. 9 is a top schematic view of a fifth exemplary embodiment of a buoyant material trap.
Figure 10:
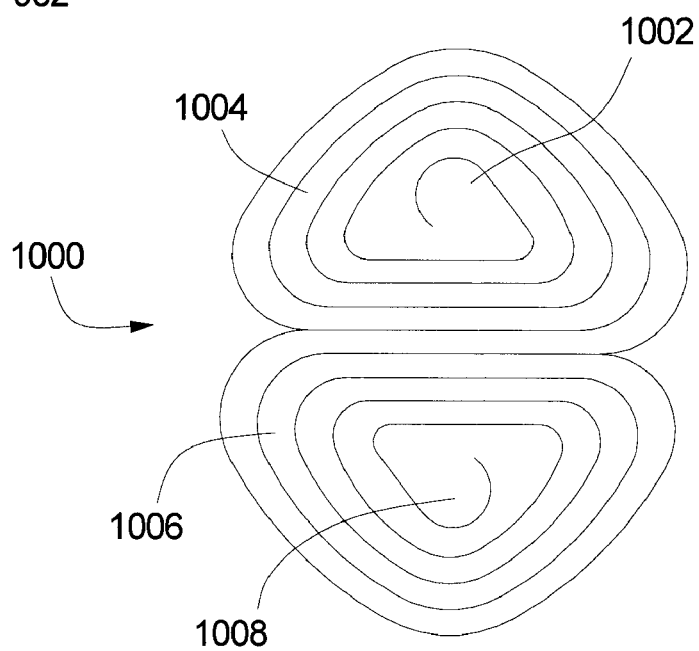
FIG. 10 is a top schematic view of a sixth exemplary embodiment of a buoyant material trap.

It will be appreciated by persons of ordinary skill in the art that the internal passage systems and other features illustrated and described with respect to the foregoing embodiments are exemplary, and a number of variations or alternative constructions for these and other features may be used in other embodiments. Examples of other embodiments of passage systems are illustrated in FIGS. 8-10. As shown in FIG. 8, a passage system 800 may comprises a spiral passage having an inlet 804 at or near its center, and an outlet 806 at its outer perimeter, or vice versa. As shown in FIG. 9, a passage system 900 may have two or more passages, such as two parallel spiral passages 902, 904 that begin at a common central inlet area 906 (or multiple separate inlets), and end at separate outlet areas 908, 910 (or a common outlet). As shown in FIG. 10, the passage system 1000 may comprise an inlet 1002 that feeds fluid into a first spiral passage 1004, which then becomes a second spiral passage 1006 that terminates at an outlet 1008. These and other variations will be apparent to persons of ordinary skill in the art upon considering the present disclosure, and such variations may be sought to fit the passage system into a predetermined space, to provide the desired amount of fluid separation, to reduce manufacturing costs (such as by using repeating patterns), to improve serviceability (such as by using removable walls to form the passages), or to obtain other goals described herein or otherwise.

The exemplary embodiments described herein are not intended to limit the scope of the appended claims. Furthermore, the claims may be practiced in any number of other ways, and, where suitable, in other contexts. For example, although embodiments disclosed herein have been described as under sink traps for grease, oil, fats and other buoyant materials, the principles and structures herein are applicable to other applications. Furthermore, embodiments may use more complex or much simpler passage systems, such as a simple set of vertical baffles, instead of the shown passage systems. These and other modifications of the exemplary embodiments will be apparent to those of ordinary skill in the art in view of the present disclosure, and such modifications are intended to fall within the scope of the following appended claims. Accordingly, the claims set forth below should be construed broadly to encompass the full breadth and spirit of the claimed inventions.

The invention claimed is:

1. A trap for removing buoyant material from fluid, the trap comprising:
   a treatment tank comprising a base wall and a vertically-extending sidewall;
   a feed pipe adapted to introduce a fluid flow at a first location in the treatment tank;
   an exit pipe adapted to remove at least a portion of the fluid flow from a second location in the treatment tank; and
   one or more wall structures adapted to form a circuitous passage, with respect to a horizontal plane, between the first location and the second location, the one or more wall structures extending from the base wall to a point below the sidewall and being open at a top end thereof, thereby substantially preventing the fluid flow from passing below the circuitous passage, but allowing buoyant material in the fluid flow to rise above the circuitous passage, wherein the circuitous passage has a generally constant width from the first location to the second location, the width being approximately equal to a width of the feed pipe;
   wherein the one or more wall structures are removably installed in the treatment tank such that the one or more wall structures can be lifted out of the treatment tank to facilitate cleaning.

2. The trap of claim 1, wherein the one or more wall structures comprises at least two wall structures that are identical to one another and interchangeably positionable in multiple locations within the treatment tank.

3. The trap of claim 2, wherein at least one of the one or more wall structures comprises a main wall having two or more cross-walls extending from one side thereof.

4. The trap of claim 3, wherein the two or more cross-walls extend from one side of the main wall at an angle of about 90 degrees.

5. The trap of claim 3, wherein the two or more cross-walls extend from the main wall to form an F-shaped structure having two or more cross-walls.

6. The trap of claim 3, wherein the two or more cross-walls comprise two cross-walls extending from respective ends of the main wall to form a C-shape.

7. The trap of claim 1, wherein the one or more wall structures comprises a plurality of wall structures that are all identical to one another and interchangeably positionable in multiple locations within the treatment tank.

8. The trap of claim 1, wherein at least one of the sidewall and base wall comprises one or more slots into which the one or more wall structures fit.

9. The trap of claim 1, further comprising an open channel spout located near an upper end of the sidewall and adapted to funnel the buoyant material out of the treatment tank when the treatment tank is tipped towards the spout.

10. The trap of claim 1, further comprising a level indicator adapted to indicate the fluid level in the treatment chamber.

11. The trap of claim 1, further comprising a mesh net adapted to be installed between the one or more wall structures and the base wall and sidewall.

12. The trap of claim 1, wherein the first location and the second location are located vertically between the base wall and the top of the circuitous passage.

13. The trap of claim 1, wherein the exit pipe comprises a downwardly-extending standpipe.

14. The trap of claim 1, wherein the treatment tank is mounted on wheels.

15. The trap of claim 1, further comprising a skimmer adapted to move across the treatment chamber above the circuitous passage to thereby direct the buoyant material towards a treatment tank outlet.

16. The trap of claim 1, wherein the treatment tank further comprises a treatment chamber in which the circuitous passage is positioned, an overflow chamber adjacent the treatment chamber, the overflow chamber being fluidly connected to the treatment chamber such that at least a portion of the buoyant material that rises above the circuitous passage can flow into the overflow chamber.

17. A trap for removing buoyant material from fluid, the trap comprising:
   a treatment tank comprising a base wall and a vertically-extending sidewall;
   a feed pipe adapted to introduce a fluid flow at a first location in the treatment tank, the first location being located generally at a single vertical position between the base wall and a top of the vertically-extending sidewall;

an exit pipe adapted to remove at least a portion of the fluid flow from a second location in the treatment tank; and one or more wall structures adapted to form a circuitous passage, with respect to a horizontal plane, between the first location and the second location that causes the fluid flow to fully reverse direction at least twice in opposite directions along adjacent portions of the circuitous passage before reaching the second location, the one or more wall structures being open at a top end thereof to allow buoyant material in the fluid flow to rise above the circuitous passage, wherein the circuitous passage has a generally constant width from the first location to the second location, the width being approximately equal to a width of the feed pipe;

wherein the treatment tank further comprises a treatment chamber in which the circuitous passage is positioned, an overflow chamber adjacent the treatment chamber, the overflow chamber being fluidly connected to the treatment chamber such that at least a portion of the buoyant material that rises above the circuitous passage can flow into the overflow chamber.

18. The trap of claim 17, wherein the one or more wall structures extend from the base wall to a point below the sidewall to thereby substantially prevent the fluid flow from passing below the circuitous passage.

19. The trap of claim 17, wherein the one or more wall structures are removably installed in the treatment tank such that the one or more wall structures can be lifted out of the treatment tank to facilitate cleaning.

20. The trap of claim 17, further comprising a bucket adapted to be installed in the overflow chamber to receive at least a portion of the buoyant material, and removed from the overflow chamber to empty the bucket.

21. The trap of claim 20, wherein the overflow chamber is fluidly connected to the treatment chamber by a spillway, and the bucket is adapted to be installed at least partially below the spillway.

22. The trap of claim 17, wherein the overflow chamber comprises a valve located proximal to a bottom end of the overflow chamber and selectively openable to drain the overflow chamber.

23. The trap of claim 17, wherein the overflow chamber surrounds the treatment chamber.

24. The trap of claim 17, further comprising a level indicator adapted to indicate the fluid level in the overflow chamber.

25. A trap for removing buoyant material from fluid, the trap comprising:

a treatment tank comprising a base wall and a vertically-extending sidewall;

a feed pipe adapted to introduce a fluid flow at a first location in the treatment tank;

an exit pipe adapted to remove at least a portion of the fluid flow from a second location in the treatment tank;

one or more wall structures adapted to form a circuitous passage, with respect to a horizontal plane, between the first location and the second location, the one or more wall structures extending from the base wall to a point below the sidewall and being open at a top end thereof, thereby substantially preventing the fluid flow from passing below the circuitous passage, but allowing buoyant material in the fluid flow to rise above the circuitous passage wherein the circuitous passage has a generally constant width from the first location to the second location, the width being approximately equal to a width of the feed pipe ; and an opening located near an upper end of the sidewall through which the buoyant material can be emptied from the treatment tank when the treatment tank is tipped towards the opening;

wherein a lower edge of the sidewall below the opening is adapted to contact at least two points on a floor when the treatment tank is tipped towards the opening to thereby provide a tilting axis about which the trap can rotate.

26. The trap of claim 25, wherein the one or more wall structures are removably installed in the treatment tank such that the one or more wall structures can be lifted out of the treatment tank to facilitate cleaning.

27. The trap of claim 25, wherein the one or more wall structures comprises at least two wall structures that are identical to one another and positionable in multiple locations within the treatment tank.

28. The trap of claim 25, wherein the one or more wall structures comprises a plurality of wall structures that are all identical to one another and positionable in multiple locations within the treatment tank.

29. The trap of claim 25, wherein the opening comprises an open channel spout.

* * * * *